
United States Patent [19]

Akaike

[11] Patent Number: 4,755,115
[45] Date of Patent: Jul. 5, 1988

[54] SHAFT SEAL ASSEMBLY FOR COMPRESSOR

[75] Inventor: Seiji Akaike, Atsugi, Japan

[73] Assignee: Atsugi Motor Parts Company, Limited, Japan

[21] Appl. No.: 63,795

[22] Filed: Jun. 22, 1987

Related U.S. Application Data

[63] Continuation of Ser. No. 795,427, Nov. 6, 1985, abandoned.

[30] Foreign Application Priority Data

Nov. 21, 1984 [JP] Japan .......................... 59-177354[U]
Apr. 9, 1985 [JP] Japan .................................. 60-53133

[51] Int. Cl.$^4$ ........................ F04U 77/00; F16J 15/00
[52] U.S. Cl. ..................................... 418/104; 418/270; 277/152; 277/153
[58] Field of Search ............... 418/102, 104, 268–270, 418/96–98; 277/152, 153, 134, 47

[56] References Cited

U.S. PATENT DOCUMENTS

| | | | |
|---|---|---|---|
| 2,249,141 | 7/1941 | Johnson | 277/152 |
| 2,476,324 | 7/1949 | Reich | 277/152 |
| 2,804,324 | 8/1957 | Stallings | 277/153 |
| 2,867,457 | 1/1959 | Riesing | 277/153 |
| 3,099,454 | 7/1963 | Walinski | 277/152 |
| 3,254,898 | 6/1966 | Herbenar | 277/47 |
| 3,516,679 | 6/1970 | Schmitt | 277/153 |
| 3,549,445 | 12/1970 | McMahon | 277/184 |
| 3,743,453 | 7/1973 | Abendschein | 418/88 |
| 3,801,114 | 4/1974 | Bentley | 277/134 |
| 3,834,846 | 9/1974 | Linder | 418/270 |
| 3,938,813 | 2/1976 | Forch | 277/152 |
| 4,522,411 | 6/1985 | Burgan | 277/153 |
| 4,550,920 | 11/1985 | Matsushima | 277/134 |

FOREIGN PATENT DOCUMENTS

| | | | |
|---|---|---|---|
| 1258972 | 3/1961 | France | 277/152 |
| 150659 | 11/1981 | Japan | 277/152 |
| 2102084 | 1/1983 | United Kingdom | 277/152 |

*Primary Examiner*—Carlton R. Croyle
*Assistant Examiner*—Jane E. Obee
*Attorney, Agent, or Firm*—Lane and Aitken

[57] ABSTRACT

A shaft seal assembly for a compressor in which the compressor includes a drive shaft adapted to be connected with the crank shaft of an combustion engine, comprising: an annular seal lip made of rubber and an annular seal ring made of fluoropolymer. The annular seal lip and seal ring are disposed in an axial direction which is substantially parallel with the axis of rotation of the drive shaft in such a manner that the escape of lubricating oil and refrigerant around the drive shaft is prevented.

10 Claims, 6 Drawing Sheets

SHAFT SEAL ASSEMBLY FOR COMPRESSOR

This application is a continuation of application Ser. No. 795,427 filed Nov. 6, 1985, now abandoned.

Field of the Invention

The present invention relates to a shaft seal assembly for a compressor, for example, which is used in an air conditioning apparatus of an automotive vehicle.

Summary of the Invention

In accordance with an important aspect of the present invention, there is provided a shaft seal assembly for a compressor in which the compressor includes a drive shaft adapted to be connected with the crank shaft of an combustion engine, comprising: an annular seal lip made of rubber and an annular seal ring made of fluoropolymer, the annular seal lip having a radially inward end portion which extends in an axial direction substantially parallel with the axis of rotation of the drive shaft and which is held in engagement with an outer surface of the drive shaft, the annular seal ring having a radially inward end portion which extends in the axial direction and which is held in engagement with the outer surface of the drive shaft, the radially inward end portions of the annular seal lip and the annular seal ring being spaced in the axial direction.

DESCRIPTION OF THE PRIOR ART

In general, a shaft seal assembly for a compressor is exposed to the pressure in the outlet port of the compressor but recently exposed to a relatively lower pressure. Such shaft seal assembly of the prior art used under the lower pressure is shown in FIG. 9. The conventional shaft seal assembly comprises a seal ring 1 made of Teflon (tetrafluoroethylene polymer) and a support ring 3 having the seal ring 1 secured thereto by means of adhesive 2. The support ring 3 is forcibly inserted in a cavity 5 formed in a casing 4 of the compressor and held in position by a retainer ring 6 disposed in a groove formed in the casing 4. The seal ring 1 is arranged in engagement with the outer surface of a drive shaft 7 of the compressor to prevent the escape of fluid or gas around the shaft 7.

The seal ring 1 of the conventional shaft seal assembly maintains its configuration to provide a sealing effect, even when the compressor is in operation at high speed, independently of the presence of the differential pressure between the interior and exterior of the casing 4, that is, across the seal ring 1. In addition, the seal ring 1 provides good sealing under an extremely low friction force due to oil film of a lubricant which is confined between the seal ring 1 and the shaft 7.

The conventional shaft seal assembly constructed only by the seal ring 1 of Teflon, while satisfactory when the compressor is operated, is found to have some drawbacks when the compressor is not operated. For example, the Teflon seal ring 1 has good sealing when the shaft 7 is revolved, but is not sufficient for the sealing when the shaft 7 is stopped. By reason that the Teflon seal ring 1 cannot be resiliently deformed easily, as compared with a seal lip made of resilient rubber, due to its high rigidity and share hardness, the engagement of the Teflon seal ring 1 with the shaft 7 becomes insufficient to seal when the compressor is brought into stop. If the compressor is used in an air conditioning apparatus of an automotive vehicle, a non-operational period of time is longer than an operational period of time. Thus, an insufficient sealing problem is involved in the prior art shaft seal assembly, particularly when the compressor is not operated. On the other hand, if a seal lip made of resilient rubber is solely used instead of the Teflon seal ring 1, the seal lip cannot provide good sealing when the compressor is in operation and thus is unsuitable for practical use, because the seal lip is liable to deform or wear due to the differential pressure during the operation of the compressor.

FIG. 10 shows sealing test results obtained from the shaft seal assembly constructed as above described with the quantity of the leakage in g/24 hr taken on the ordinate and with the number of the cycle taken on the abscissa. As seen from FIG. 10, the quantity of the leakage is large when the compressor is not operated.

Accordingly, an important object of the present invention is to provide an improved shaft seal assembly which can eliminate the drawbacks inevitably inherent in the prior art and which can maintain excellent sealing independently of the operating and unoperated conditions of the compressor.

BRIEF DESCRIPTION OF THE FIGURES OF THE DRAWINGS

The drawbacks of a prior art shaft seal assembly and the features and advantages of an improved shaft seal assembly according to the present invention will be more clearly understood from the following description taken in conjunction with the accompanying drawings in which like reference characters designate corresponding or similar members throughout the figures of the drawings and in which.

DETAILED DESCRIPTION OF THE PREFERRED EMBODIMENTS

Figure 1:
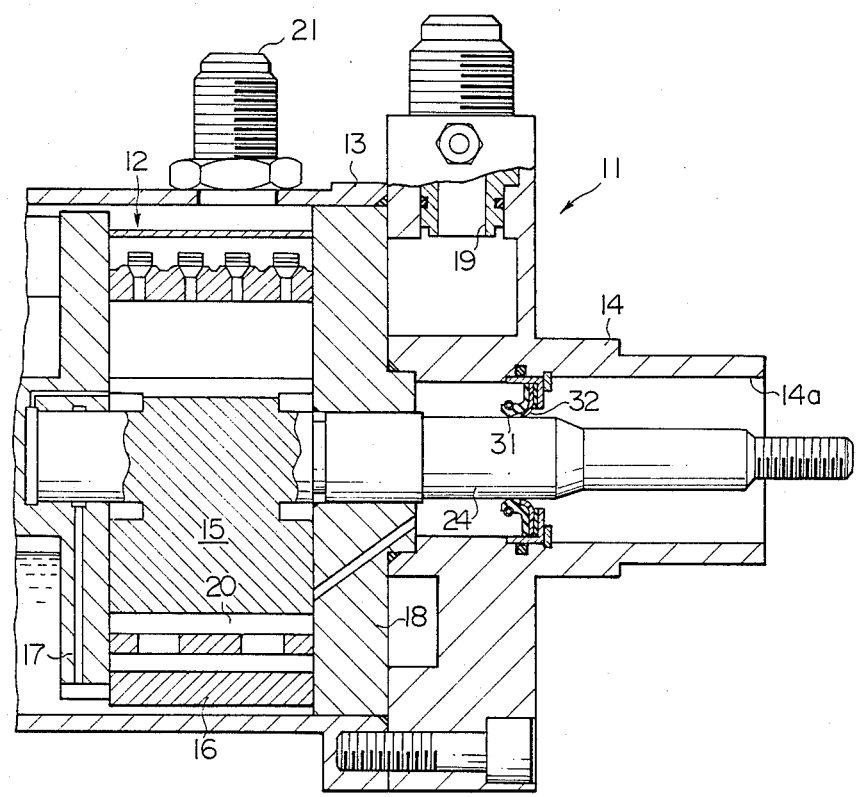
FIG. 1 is a longitudinal cross sectional view showing a rotary fluid compressor of the vane type in which a shaft seal assembly embodying the present invention is incorporated.

Referring to FIG. 1, which is a longitudinal cross sectional view showing a rotary fluid compressor of the vane type in which a shaft seal assembly embodying the present invention is incorporated, the compressor of the vane type is designated generally by reference character 11. The compressor 11 includes a rotor housing 13 having a compression unit 12 housed therein, and a front cover 14 to close the rotor housing 13. The rotor housing 13 and front cover 14 are held in axially fast, assembled relationship by suitable clamping means, such, for example, as clamping bolts. The front cover 14 is formed with an axial bore 14a through which a drive shaft 24 extends. The drive shaft 24 is adapted to be connected at the right-hand side thereof in FIG. 1 through a magnetic clutch (not shown) to the crank shaft of an internal combustion engine. The compression unit 12 includes a cam ring 16 and a pair of side plates 17 and 18 arranged in opposite side faces of the cam ring 16. Situated within the cam ring 16 and between the side plates 17 and 18 is a rotary member 15 of circular configuration. The rotary member 15 is formed with a central opening which is internally splined to permit splined connection with the drive shaft 24.

The compression unit 12 of the compressor 11 serves to draw refrigerant from an intake port 19 formed in the front cover 14 into a pumping chamber 20 defined by the internal cam surface of the cam ring 16 and the external surface of rotary member 15, and compress and discharge the refrigerant from a discharge port 21 formed in the rotor housing 13. The lubrication for the parts or portions within the compression unit 12 which are subjected to friction is established by separating lubricating oil from the refrigerant containing the lubricating oil in a mist state by a separator (not shown) and by using the lubricating oil stored in the bottom portion in the rotor housing 13.

The shaft seal assembly forming the subject matter of the present invention is provided on the drive shaft 24 extending through the axial bore 14a toward the interior of the compressor 11 for the purpose of preventing the escape of lubricating oil and refrigerant around the drive shaft 24 from the interior of the compressor 11 to the exterior.

Figure 2:
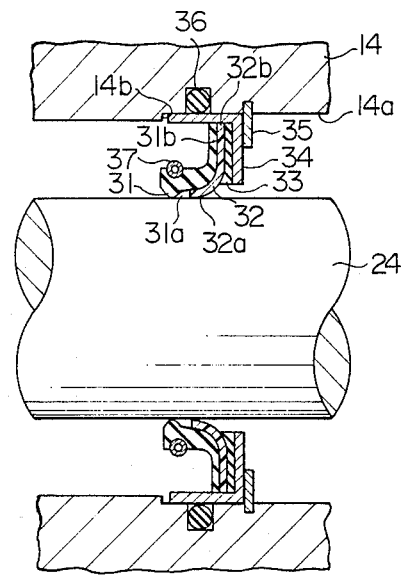
FIG. 2 is an enlarged cross sectional view of the shaft seal assembly shown in FIG. 1.

With reference to FIG. 2, the shaft seal assembly constructed in accordance with the present invention is shown which comprises an annular seal lip 31 made of nitrile rubber and an annular seal ring 32 made of fluoropolymer such, for example, as Teflon (tetrafluoroethylene polymer) which are respectively arranged from the left-hand side toward the right-hand side in FIG. 2. That is, the annular seal lip 31 is arranged between the annular seal ring 32 to be subjected to pressure existing in the compressor 11. The annular seal ring 31 and seal lip 32 are disposed in such a manner that the escape of the lubricating oil and refrigerant around the drive shaft 24 is effectively prevented. The annular seal lip 31 is constructed to have a radially inward end portion 31a which extends substantially in the axial direction substantially parallel with the axis of rotation of the drive shaft 24 and which has a sealing surface held in engagement with the outer surface of the drive shaft 24. The sealing surface has an arcuate shape in cross section. The radially inward end portion 31a has embedded therein suitable spring means such, for example, as a garter spring 37 in such a manner as to radially inwardly urge the sealing surface into sealing engagement with the outer surface of the drive shaft 24. The annular seal lip 31 further has a vertical portion 31b which extends from the radially inward end portion 31a in a radial direction substantially perpendicular the axial direction and which terminates in an annular support metal ring 34 to be described later. Similarly, the annular seal ring 32 is constructed to have a radially inward end portion 32a which extends substantially in the axial direction and which has a sealing surface held in sealing engagement with the outer surface of the drive shaft 24, and a vertical portion 32b which extends in the radial direction from the radially inward end portion 32a and which is held in sealing engagement with the vertical portion 31a of the annular seal lip 31. The annular seal lip 31 and seal ring 32 thus constructed are secured by means of suitable mounting means such as rubber or adhesive 33 to a support metal ring 34 having a L-shaped cross section, with the sealing surfaces of the radially inward end portions 31a and 32a of the annular seal lip 31 and seal ring 32 arranged to be spaced from each other in the axial direction. The support ring 34 is held against a shoulder portion 14b of the axial bore 14 by a snap ring 35 received in a groove formed in the front cover 14. A resilient O-ring 36 is interposed between a groove formed in the front cover 14 of the compressor 11 and the support metal ring 34 for the purpose of separating the interior of the compressor from the exterior. Thus, in this embodiment, the rubber seal lip 31 and the Teflon seal ring 32 are respectively disposed from the interior of the compressor 11 toward the exterior so as to be overlapped with each other in the axial direction which is substantially parallel with the drive shaft 24.

More specifically, the rubber seal lip 31 has a radially inward end portion 31a which extends in an axial direction substantially parallel with the axis of rotation of the drive shaft 24 and which has a sealing surface held in engagement with an outer surface of the drive shaft. The seal ring 32 has a radially inward end portion 32a which extends in the axial direction of the drive shaft 24 and has a sealing surface held at all times in engagement with the outer surface of the drive shaft. There is a gap between the sealing surfaces defined by the radially inward end portions 31a and 32a of the seal lip 31 and the seal ring 32, respectively, in the axial direction of the drive shaft 24, and a part of the radially inward portion 31a of the annular seal lip 31 and the radially inward portion 32a of the annular seal ring 32 are superimposed and in engagement at all times throughout the length of the radially inward portion 32a.

In the shaft seal assembly constructed and arranged as above described, since the annular seal ring 32 made of Teflon can maintain its configuration during the operation of the compressor 11 even if the differential pressure between the interior and exterior of the compressor 11 increases, and due to dynamic pressure effect of the oil film of the lubricant confined between the annular seal ring 32 and drive shaft 24, the escape of lubricating oil and refrigerant around the drive shaft 24 is substantially completely prevented. On the other hand, when the compressor 11 is not operated, the annular seal lip 31 made of rubber is held in sealing engagement with the outer surface of the drive shaft 24 due to its resiliency. Hence, the escape of lubricating oil and refrigerant around the drive shaft 24 is also substantially completely prevented.

Figure 3:
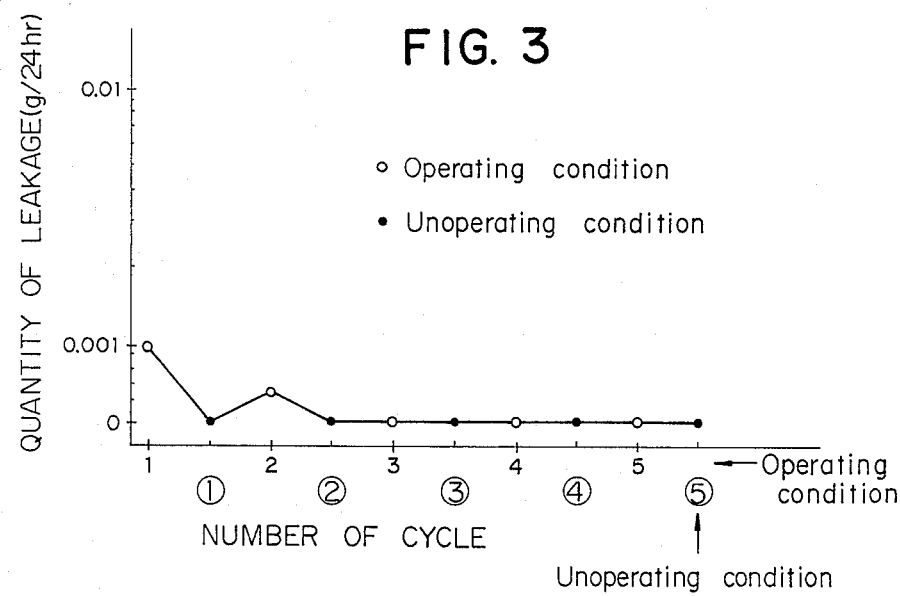
FIG. 3 shows sealing test results obtained from the present invention with the quantity of the leakage in g/24 hr taken on the ordinate and with the number of cycle taken on the abscissa.

FIG. 3 shows sealing test results obtained from the shaft seal assembly of the present invention with the quantity of the leakage in g/24 hr taken on the ordinate and with the number of cycle taken on the abscissa. As seen from FIG. 3, when the compressor is in operation, the leakage from the shaft seal assembly constructed in accordance with the present invention is completely eliminated, after a predetermined hours (24 hours) passed, by means of the Teflon seal ring 32, while when the compressor is not in operation, the leakage is also completely eliminated by means of the rubber seal lip 31. Thus, the escape of lubricating oil and refrigerant around the drive shaft 24 is effectively prevented by the combination of the rubber seal lip 31 and Teflon seal ring 32.

Figure 4:
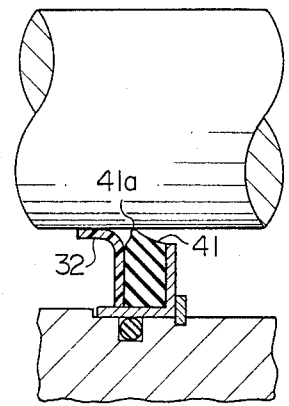
FIG. 4 is a cross sectional view of another shaft seal assembly of a second embodiment constructed in accordance with the present invention.

Referring to FIG. 4, there is shown is another shaft seal assembly of a second embodiment constructed in accordance with the present invention. In this embodiment, the annular seal ring 32 is arranged between of an annular seal lip 41 to be subjected to pressure existing in the compressor and the pressure in the compressor. The annular seal lip 41 is constructed to have a radially inward end 41a which is held in sealing engagement with the outer surface of the drive shaft 24 so that the garter spring as used in the first embodiment is not necessary for this seal arrangement. Thus, the arrangement of the second embodiment provides a more economical construction than that of the previous embodiment. In addition, the durability of the rubber seal ring 41 and accordingly the shaft seal assembly itself is enhanced because the annular seal ring 41 is not directly exposed to the lubricating oil or gas to be heated at a high temperature.

Figure 5:
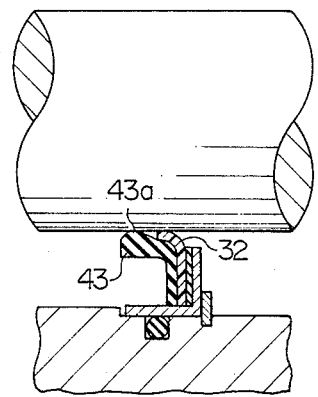
FIG. 5 is a cross sectional view showing still another shaft seal assembly of a third embodiment constructed in accordance with the present invention.

FIG. 5 shows another shaft seal assembly of a third embodiment constructed in accordance with the present invention. The garter spring is also excluded from this embodiment by changing the material of the annular seal lip or by enlarging the a radially inward end portion 43a of an annular seal lip 43 in such a manner that a sealing surface is held in sealing engagement with the outer surface of the drive shaft 24, depending upon the properties of the lubricating oil. Thus, the annular seal lip 43 is constructed to have the radially inward end portion 43a which is enlarged in such a manner that a sealing surface is held in sealing engagement with the outer surface of the drive shaft 24. This construction provides a more compact arrangement than that of the first embodiment.

Figure 6:
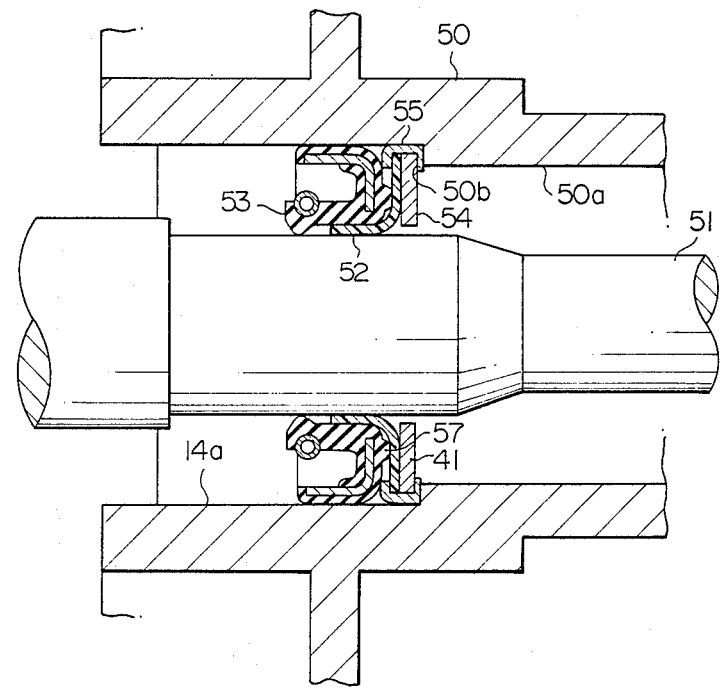
FIG. 6 is an enlarged cross sectional view showing another shaft seal assembly of a fourth embodiment constructed in accordance with the present invention.

With reference to FIG. 6, reference character 50 designates a front cover of the compressor of the vane type in which a shaft seal assembly of a fourth embodiment according to the present invention is incorporated. The front cover 50 is formed with an axial bore 50a through which a drive shaft 51 extends. The drive shaft 51 is connected at the right-hand end thereof in FIG. 6 through a magnetic clutch (not shown) with the crank shaft of an internal combustion engine.

Figure 7:
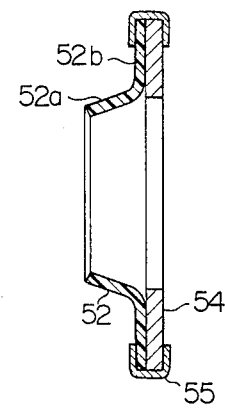
FIG. 7 is a cross sectional view, on enlarged scale, of a seal ring forming part of the shaft seal assembly shown in FIG. 6.

Within the axial bore 50a is mounted the shaft seal assembly which comprises an annular seal ring 52 made of fluoropolymer such, for example, as Teflon (tetrafluoroethylene polymer) and an annular seal lip 53 made of nitrile rubber which are respectively arranged from the right-hand side in FIG. 6 toward the left-hand side. The annular seal ring 52 and seal lip 53 are disposed to be overlapped with each other in the axial direction which is substantially parallel with the axis of rotation of the drive shaft 51, for the purpose of preventing the escape of lubricating oil and refrigerant around the drive shaft 51 from the interior of the compressor to the exterior. The annular seal ring 52 has a radially inward end portion 52a which extends substantially in the axial direction substantially parallel with the axis of rotation of the drive shaft 51 and has a sealing surface held in sealing engagement with the outer surface of the drive shaft 51, and a vertical portion 52b which extends radially outwardly from the radially inward end portion 52a and which is engaged by an annular back-up plate 54. The vertical portion 52b of the annular seal ring 52 and the annular back-up plate 54, as best shown in FIG. 7, are caulked at the radially outward end portions thereof with each other by an annular retainer 55. The annular retainer 55 is forcibly inserted into the axial bore 50a formed in the front cover 50 of the compressor, and held in position against a shoulder portion 50b of the axial bore 50a.

Figure 8:
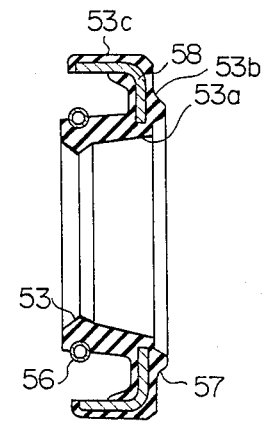
FIG. 8 is a cross sectional view, on enlarged scale, of a seal lip forming part of the shaft seal assembly shown in FIG. 6.
Figure 9:
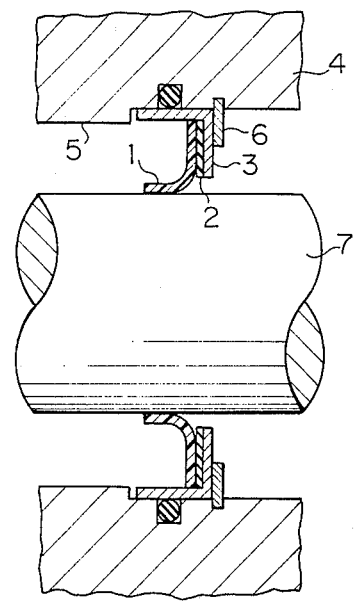
FIG. 9 is a cross sectional view showing a shaft seal assembly of the prior art.
Figure 10:
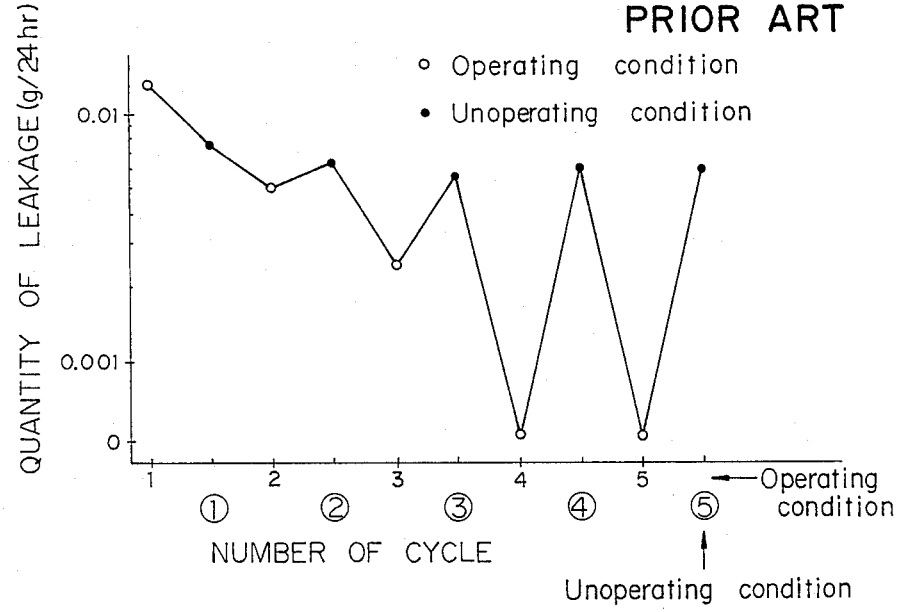
FIG. 10 shows sealing test results obtained from the prior art with the quantity of the leakage in g/24 hr taken on the ordinate and with the number of cycle taken on the abscissa.

The annular seal lip 53 to be forcibly inserted into the axial bore 50a and overlapped with the annular seal ring 52, as best shown in FIG. 8, has a radially inward end portion 53a defining a sealing surface which is to be held in engagement with the outer surface of the drive shaft 51, a vertical portion 53b which extends from the radially inward end portion 52a in a radial direction substantially perpendicular to the axial direction and which is to be overlapped with the vertical portion 52b of the annular seal ring 52, and a radially outward end portion 53c which extends substantially in the axial direction from the vertical portion 52b and which is to be held in position against the axial bore 50a of the front cover 50. The sealing surface of the radially inward end portion 53a is radially inwardly urged into sealing engagement with the outer surface of the drive shaft 51 by means of suitable spring means such, for example, as a garter spring 56 embedded in the radially inward end portion 53a. The vertical portion 53b is formed with an annular projection 57 which is to be held in sealing contact with the vertical portion 52b of the annular seal ring 52. The annular projection 57 serves as adhesion. A metal plate 58 having a L-shaped cross section is embedded in the vertical portion 53b and radially outward portion 53c.

The annular seal ring 52 and the annular seal lip 53 are manufactured individually in the respective processes. The projection 57 of the annular seal lip 53 is deformed and closely contacted with the vertical portion 52b of the annular seal ring 52 so that the annular seal lip 53 is held in position against the annular seal ring 52.

As seen from above, in this embodiment, the adhesion 53 used in the first embodiment is replaced with the annular projection 57 of the annular seal lip 53. Since the adhesion is not used in this embodiment, the shaft seal assembly is capable of being used continuously for a long period of time without deteriorating the sealing effect and provides a more economical construction. While the annular projection 57 is described and illustrated to be formed in the annular seal lip 53, it may be formed in the annular seal ring 52 and in addition, a plurality of annular projections may be provided in the annular seal lip 53 to more enhance the sealing effect in the radial direction which is substantially parallel to the axis of rotation of the drive shaft 51.

From the foregoing description, it will be seen that an improved shaft seal assembly which can eliminate the drawbacks inevitably inherent in the prior art and which can maintain excellent sealing independently of the operating and unoperated conditions of the compressor is afforded by the present invention.

While certain representative embodiments and details have been shown for the purpose of illustrating the present invention, it will be apparent to those skilled in this art that various changes and modifications may be made therein without departing from the spirit or scope of the invention.

What is claimed is:

1. A shaft seal assembly for a compressor in which the compressor includes a drive shaft adapted to be connected with the crank shaft of a combustion engine, comprising:

an annular seal lip made of rubber and an annular seal ring made of fluoropolymer, said annular seal lip having a radially inward end portion which extends in an axial direction substantially parallel with the axis of rotation of said drive shaft and which has a sealing surface held in engagement with an outer surface of said drive shaft, said annular seal ring having a radially inward end portion which extends in said axial direction and which has a sealing surface held at all times in engagement with said outer surface of the drive shaft, and a gap between said sealing surfaces of said annular seal lip and said annular seal ring in said axial direction, and a part of said radially inward poriton of said annular seal lip and said radially inward portion of said annular seal ring being superimposed and in engagement at all times throughout the length of said radially inward portion of said annular seal ring.

2. A shaft seal assembly as set forth in claim 1, in which said annular seal ring is made of tetrafluoroethylene polymer.

3. A shaft seal assembly as set forth in claim 1, further comprising means for holding the radially inward end portion of said annular seal lip in engagement with said outer surface of said drive shaft.

4. A shaft seal assembly as set forth in claim 1, wherein the sealing surface of said annular seal lip has in cross section in arcuate shape.

5. A shaft seal assembly as set forth in claim 1, in which said annular seal lip is arranged between said annular seal ring and a side of said shaft seal assembly to be subjected to pressure existing in said compressor.

6. A shaft seal assembly a set forth in claim 3, in which said annular seal lip further has a vertical portion which extends from said radially inward end portion in a radial direction which is substantially perpendicualr to said axial direction, and in which said annular seal ring further has a vertical portion which extends in said radial direction from said radially inward end portion and which is held in sealing engagement with said vertical portion of said annular seal lip.

7. A shaft seal assembly as set forth in claim 5, in which said annular seal lip is constructed to have a radially inward end portion which is enlarged in such a manner as to be held in sealing engagement with the outer surface of the drive shaft.

8. A shaft seal assembly as set forth in claim 5, in which said annular seal ring has a vertical portion which extends from said radially inward end portion in a radial direction which is substantially perpendicular to said axial direction, the vertical portion being formed with an annular projection, and in which said annular seal lip has a a vertical portion which extends in said radial direction from said radially inward end portion and a radially outward end portion which extends substantially in said axial direction, the radially inward end portion being radially inwardly urged into sealing engagement with said outer surface of said drive shaft by means of spring means embedded in said radially inward end portion, the vertical portion and radially outward portion having embedded therein a metal plate having a L-shaped cross section.

9. A shaft seal assembly as set forth in claim 5, in which said annular seal ring has a vertical portion which extends from said radially inward end portion in a radial direction which is substantially perpendicular to said axial direction, and in which said annular seal lip has a vertical portion which extends in said radial direction from said radially inward end portion, and a radially outward end portion which extends substantially in said axial direction from said vertical portion, the radially inward end portion being radially inwardly urged into sealing engagement with said outer surface of said drive shaft by means of spring means embedded in said radially inward end portion, the vertical portion being formed with an annular projection which is held in sealing contact with said vertical portion of said annular seal ring, the vertical portion and radially outward portion having embedded therein a metal plate having a L-shaped cross section.

10. A shaft seal assembly as set forth in claim 9, in which a plurality of said annular projections is provided in said annular seal lip in said radial direction which is substantially perpendicular to the axis of rotation of said drive shaft.

* * * * *